(12) United States Patent
Decker et al.

(10) Patent No.: US 12,187,447 B2
(45) Date of Patent: Jan. 7, 2025

(54) CONTROLLED POWERUP SEQUENCE FOR AN UNMANNED AERIAL VEHICLE (UAV)

(71) Applicant: Insitu, Inc., Bingen, WA (US)

(72) Inventors: Jeffrey P. Decker, Snowden, WA (US); Joseph B. Jackson, White Salmon, WA (US)

(73) Assignee: INSITU, INC., Bingen, WA (US)

( * ) Notice: Subject to any disclaimer, the term of this patent is extended or adjusted under 35 U.S.C. 154(b) by 403 days.

(21) Appl. No.: 17/375,857

(22) Filed: Jul. 14, 2021

(65) Prior Publication Data

US 2022/0089291 A1    Mar. 24, 2022

Related U.S. Application Data

(60) Provisional application No. 63/082,270, filed on Sep. 23, 2020.

(51) Int. Cl.
*B64D 31/04* (2006.01)
*G05D 1/00* (2024.01)
*G08G 5/00* (2006.01)

(52) U.S. Cl.
CPC ........... *B64D 31/04* (2013.01); *G05D 1/0016* (2013.01); *G05D 1/0044* (2013.01); *G08G 5/0069* (2013.01); *B64U 2201/20* (2023.01)

(58) Field of Classification Search
CPC ........ B64D 31/04; B64D 31/02; B64D 45/00; B64C 39/024; G05D 1/0016; G05D 1/0044; G08G 5/0069; B64U 10/25; B64U 2201/20; G05B 19/0423; G05B 2219/25257
See application file for complete search history.

(56) References Cited

U.S. PATENT DOCUMENTS

| | | | |
|---|---|---|---|
| 10,115,555 B1 | 10/2018 | Grenier et al. | |
| 11,771,076 B2* | 10/2023 | Zhou | A01M 7/0089 701/11 |
| 2015/0158392 A1* | 6/2015 | Zhao | B60L 53/80 320/109 |
| 2016/0091894 A1* | 3/2016 | Zhang | G05D 1/0044 701/2 |

(Continued)

OTHER PUBLICATIONS

European Patent Office, Extended European Search Report, issued in connection with Application No. 21192090.5, dated Feb. 3, 2022, 6 pages.

(Continued)

*Primary Examiner* — Jelani A Smith
*Assistant Examiner* — Alyssa Rorie
(74) *Attorney, Agent, or Firm* — Hanley, Flight & Zimmerman, LLC

(57) ABSTRACT

A controlled power up sequence for an unmanned aerial vehicle (UAV) is disclosed. A disclosed example controlled power up sequence for a UAV includes a remote user terminal, and a power sequence control interface including a transceiver communicatively coupled to the remote user terminal, a user-operated switch of the UAV, and a power controller to electrically couple a power source of the UAV to a propulsion system of the UAV in response to the user-operated switch being toggled on and the power sequence control interface receiving, via the transceiver, a power on signal from the remote user terminal.

22 Claims, 5 Drawing Sheets

(56) References Cited

U.S. PATENT DOCUMENTS

| | | | |
|---|---|---|---|
| 2017/0061813 A1* | 3/2017 | Tao | G09B 9/08 |
| 2017/0129603 A1* | 5/2017 | Raptopoulos | G08G 5/0069 |
| 2018/0050798 A1* | 2/2018 | Kapuria | B64D 47/08 |
| 2018/0120829 A1* | 5/2018 | Price | G05D 1/0022 |
| 2018/0141676 A1 | 5/2018 | Suzuki et al. | |
| 2018/0359792 A1* | 12/2018 | Jensen | G06F 3/0482 |
| 2020/0122830 A1* | 4/2020 | Anderson | B60L 50/60 |
| 2021/0031918 A1* | 2/2021 | Zhang | H02J 9/068 |
| 2022/0116237 A1* | 4/2022 | Pang | G06F 3/04162 |
| 2023/0161339 A1* | 5/2023 | Takahashi | B64C 39/024 |
| | | | 701/2 |

OTHER PUBLICATIONS

European Patent Office, Communication under Rule 71(3) EPC, issued in connection with Application No. 21192090.5, dated May 9, 2023, 33 pages.

\* cited by examiner

CONTROLLED POWERUP SEQUENCE FOR AN UNMANNED AERIAL VEHICLE (UAV)

RELATED APPLICATION

This patent claims the benefit of U.S. Provisional Patent Application No. 63/082,270, which was filed on Sep. 23, 2020. U.S. Patent Application Ser. No. 63/082,270 is hereby incorporated herein by reference in its entirety. Priority to U.S. Patent Application Ser. No. 63/082,270 is hereby claimed.

FIELD OF THE DISCLOSURE

This disclosure relates generally to unmanned aerial vehicles (UAVs), and, more particularly, to a controlled power up sequence of a UAV.

BACKGROUND

In recent years, unmanned aerial vehicles (UAV) have become commonly used in operations in which manned flight would be undesirable or impractical. Particularly, UAVs can be operated remotely via wireless communication devices. However, powering on a UAV often requires physical interaction with a ground crew.

SUMMARY

An example system for controlling a power up sequence of an unmanned aerial vehicle (UAV) includes a remote user terminal, and a power sequence control interface including a transceiver communicatively coupled to the remote user terminal, a user-operated switch of the UAV, and a power controller to electrically couple a power source of the UAV to a propulsion system of the UAV in response to the user-operated switch being toggled on and the power sequence control interface receiving, via the transceiver, a power on signal from the remote user terminal.

An example apparatus for controlling a power up sequence of an unmanned aerial vehicle (UAV) includes a switch verifier to determine whether a user-operated switch has been toggled on, a signal analyzer to determine whether a power on signal has been received from a remote user terminal, and a power controller to electrically couple a propulsion system of the UAV to a power source of the UAV in response to the user-operated switch being toggled on and the power on signal being received from the remote user terminal.

An example method includes determining, by executing instructions with at least one processor, that a user-operated switch of an unmanned aerial vehicle (UAV) has been toggled on, determining, by executing instructions with the at least one processor, that a power on signal has been received from a remote user terminal, and, in response to the user-operated switch being toggled on and receiving the power on signal from the remote user terminal, electrically coupling, by executing instructions with the at least one processor, a power source of the UAV to a propulsion system of the UAV.

An example non-transitory computer readable storage medium includes instructions that, when executed, cause a processor to at least determine that a user-operated switch of an unmanned aerial vehicle (UAV) has been toggled on, determine that a power on signal has been received from a remote user terminal, and in response to the user-operated switch being toggled on and receiving the power on signal from the remote user terminal, enable electrically coupling of a power source of the UAV to a propulsion system of the UAV.

Figure 1:
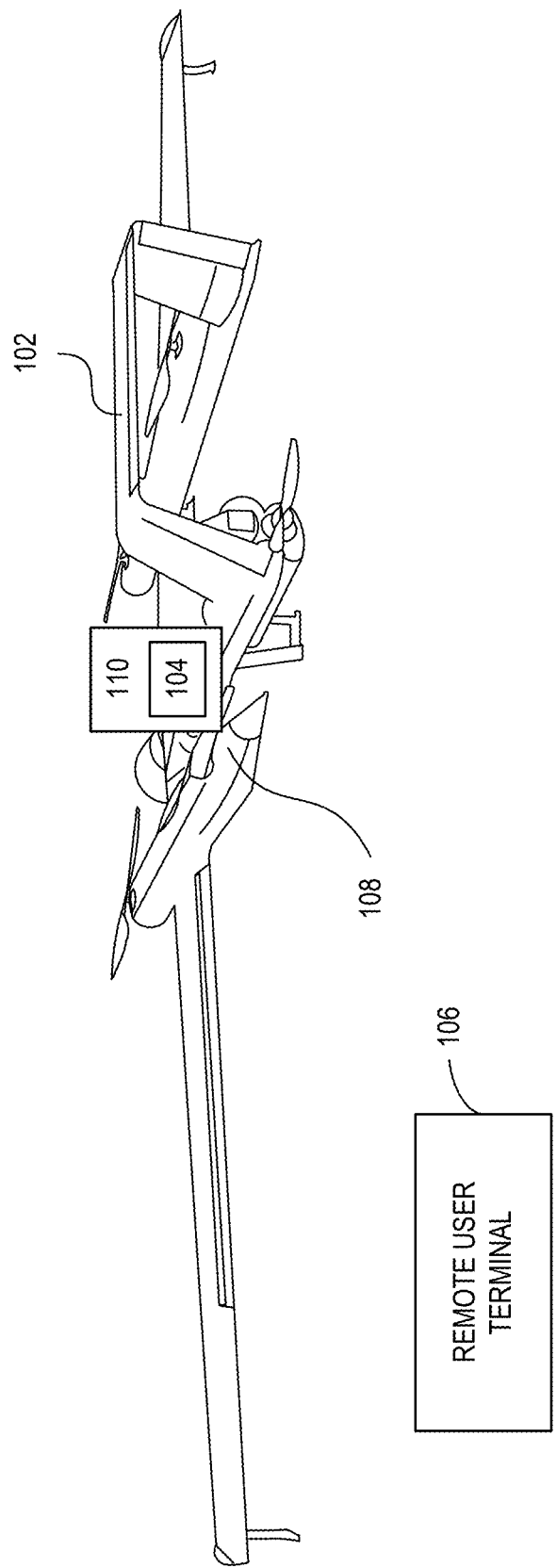
FIG. 1 illustrates an example aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A controlled power up sequence for an unmanned aerial vehicle (UAV) is disclosed. Typically, propulsion systems implemented on UAVs include moving parts in the form of rotors, propellers, and/or ducted fans. The UAVs are sometimes operated by a remote user terminal (e.g., a computer) to control the UAV during flight. Usually, a ground crew operates in close proximity to the UAV to initiate power up thereof.

Examples disclosed herein enable a controlled execution of a power up sequence of a UAV. Examples disclosed herein implement a power sequence control system that is communicatively coupled to a remote user terminal. The example power sequence control system electrically couples a battery to a propulsion system after a user-operated switch is toggled and a power on signal is received from the remote user terminal. As a result, a probability of inadvertent or accidental start up of the propulsion system is reduced (e.g., eliminated).

In some examples, a delay is implemented to provide time for the ground crew to move away from the UAV before the propulsion system of the UAV is activated. When the power up sequence is not executed correctly, the example power sequence control system can prevent power to the propulsion system and/or require power up sequence to be restarted. Additionally or alternatively, examples disclosed herein provide visual indications corresponding to a particular stage in the power up sequence (e.g., a visual indication to indicate that the power up sequence was unsuccessful). For example, the visual indications are generated by a light source (e.g., an LED light, a strobing light, a multicolor light, etc.), including one or more colored lights with one or more flashing patterns corresponding to the stage of the power up sequence. Additionally or alternatively, the stage in the power up sequence is indicated by an audio indication.

As used herein, the term "rotor" refers to a rotating component, assembly and/or device of an aircraft to produce a thrust on the aircraft. As used herein, the term "remote user terminal" refers to a communication device (e.g., laptop computer, a personal computing device, a tablet, a mobile phone, etc.) operated by one or more users.

FIG. 1 illustrates an example aircraft 102 in which examples disclosed herein can be implemented. In the illustrated example of FIG. 1, the aircraft 102 is implemented as a fixed wing UAV. For example, the aircraft 102 can be implemented as a vertical takeoff and landing (VTOL) aircraft. In other examples, the aircraft 102 may be a conventional takeoff and landing (CTOL) aircraft or a short takeoff and landing (STOL) aircraft. Although the aircraft 102 of FIG. 1 is a UAV in this example, in some examples, the aircraft 102 is manned.

The example aircraft 102 includes an example power sequence control system (e.g., an onboard power control interface, a power sequence control interface) 104 communicatively coupled to a remote user terminal (e.g., a ground terminal) 106 that is separate from the aircraft 102. The aircraft 102 further includes a nacelle 108 with an onboard controller 110 mounted thereto, the onboard controller 110 including the power sequence control system 104. The remote user terminal 106 may be implemented as a computer (e.g., laptop computer, a personal computing device, a tablet, a mobile phone, etc.) that is communicatively coupled to the onboard controller 110 via a wireless network and/or interface, for example. In the illustrated example, the aircraft 102 is controlled by a user via the remote user terminal 106. For example, the remote user terminal 106 can implement software to allow the user to direct movement of the aircraft 102 during flight. In some examples, the remote user terminal 106 receives data from the aircraft 102 including video data, location data, and/or altitude data. In some such examples, the remote user terminal 106 outputs the data onto a display for the user.

Figure 2:
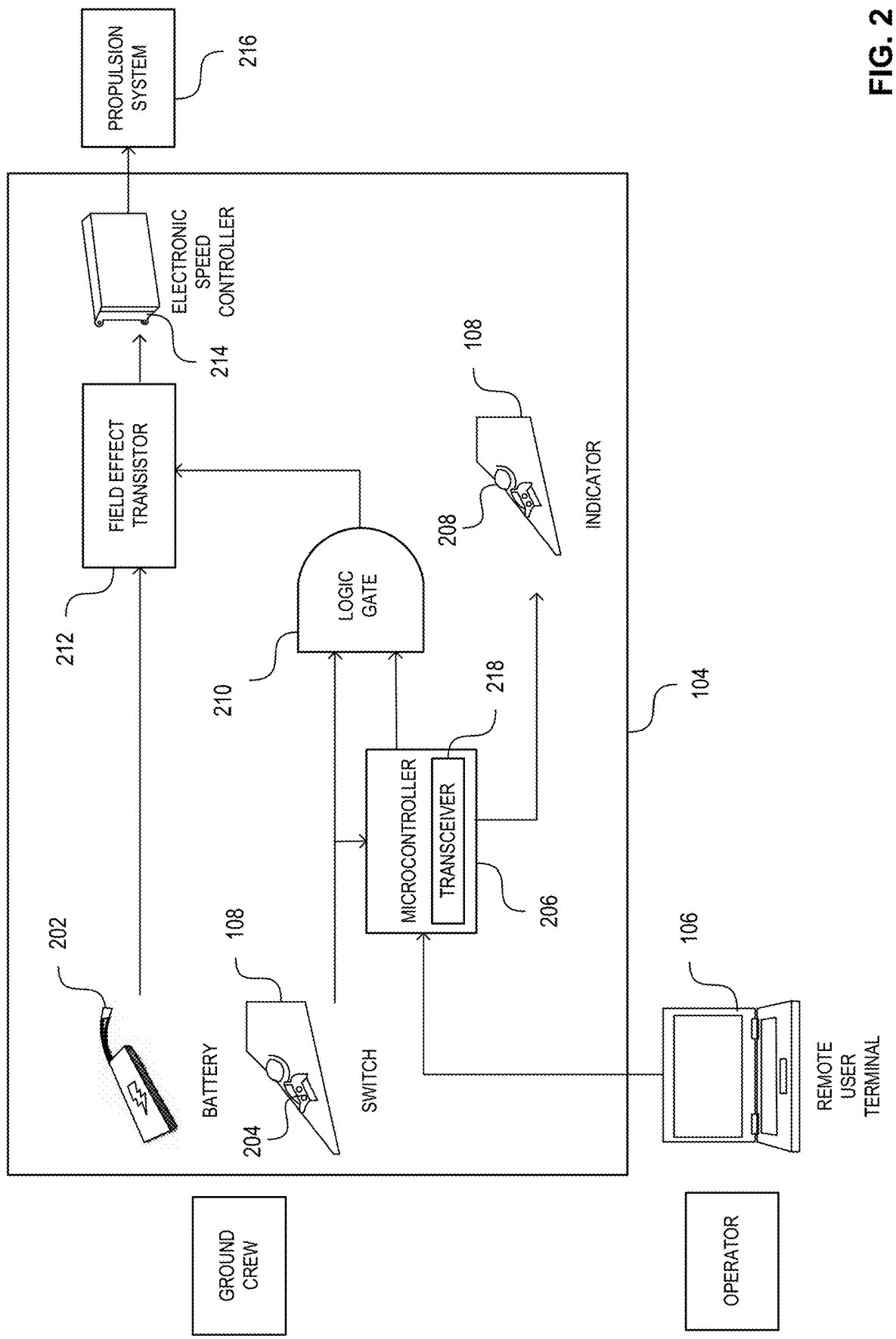
FIG. 2 an example power sequence control system in accordance with the teachings of this disclosure.

FIG. 2 illustrates the example power sequence control system 104 of FIG. 1 in accordance with teachings of this disclosure. In the illustrated example of FIG. 2, the power sequence control system 104 is shown communicatively coupled/couplable to the remote user terminal 106. The power sequence control system 104 of the illustrated example includes a battery 202, a switch (e.g., a manually operated switch, a toggle switch, etc.) 204, a microcontroller 206, an indicator (e.g., an LED light) 208, a logic gate 210, a field-effect transistor (FET) 212, and an electronic speed controller (ESC) 214. In this example, the ESC 214 is electrically coupled to and/or is part of a propulsion system 216.

In the illustrated example of FIG. 2, the remote user terminal 106, which is implemented as a laptop in this example, is communicatively coupled to the power sequence control system 104. However, in other examples, the remote user terminal 106 is another type of computer device, such as a desktop computer, a mobile device, a tablet, a mobile phone, etc. The example remote user terminal 106 is operated by an operator at a distance from the aircraft 102.

The example microcontroller 206 of the aircraft 102 is communicatively coupled (e.g., wirelessly communicatively coupled) to the remote user terminal 106. Further, the example microcontroller 206 is communicatively coupled to the indicator 208, the switch 204, and the logic gate 210. In some examples, the microcontroller 206 includes a transceiver (e.g., a wireless transceiver, a wired transceiver, etc.) 218 to send and receive signals to and from the remote user terminal 106.

The example indicator 208 is implemented as an LED and mounted to an exterior of the aircraft 102. In the illustrated example, the microcontroller 206 powers the indicator 208 and the indicator 208 includes multiple LEDs that can emit different colors (e.g., different colors in a repeating pattern). Additionally or alternatively, the microcontroller 206 can selectively control specific ones of the LEDs of the indicator 208 to be turned on or off, the duration for which the LEDs are turned on or off, and/or the brightness of the LEDs. In some examples, the duration, the color, and/or the intensity of light of the one or more LEDs correspond to a status or a current stage of the power sequence control system 104 during an initialization of the aircraft 102. In the illustrated example, the indicator 208 is mounted on the nacelle 108 of the aircraft. The example indicator 208 can be mounted at a position on the aircraft 102 such that the indicator 208 is visible to one or more ground crew operators at a distance from the aircraft 102. Additionally or alternatively, a transparent casing or housing is implemented to house and protect the indicator 208 during operation and/or from environmental damage.

In the illustrated example, the switch 204 is mounted on or proximate the nacelle 108 of the aircraft 102. In this particular example, the switch 204 is implemented in a compartment of the nacelle 108 that can be opened or closed. In some examples, the switch 204 is a toggle switch, a rotary switch, a push-button, or any other appropriate mechanism and/or device to turn on or off a corresponding device or system. In some examples, the switch 204 is integral with the microcontroller 206 and the logic gate 210.

In operation, in response to the switch 204 being toggled on by a user, the switch 204 transmits a first signal to the microcontroller 206 and/or the logic gate 210. In particular, the first signal indicates that the switch 204 has been toggled on to the microcontroller 206 and, in turn, the logic gate 210. Further, a power on signal is provided to the microcontroller 206 from the remote user terminal 106 via the transceiver 218 and the microcontroller 206 then provides a second signal to the logic gate 210. As a result, the logic gate 210 causes the FET 212 to electrically couple and/or connect the battery 202 to the electronic speed controller 214 and/or the propulsion system 216. In other words, the first and second signals interacting with the logic gate 210 causes electrical current to flow from the battery 202 and toward the electronic speed controller 214. As a result, power is provided to the propulsion system 216 of the aircraft 102. In other examples, however, any other appropriate type of electronic switch can be used instead of the FET 212.

In the illustrated example, to direct movement of the aircraft 102, the electronic speed controller 214 is electrically coupled to one or more electric motors of the propulsion system 216 of the aircraft 102. In particular, the example electronic speed controller 214 is implemented to vary the rotation speed of the one or more electric motors and, in turn, control the amount of thrust produced by the rotors of the aircraft 102. In some examples, the rotation speed of the one or more electric motors is proportional to the amount of current transmitted from the battery 202 to the electronic speed controller 214.

In some examples, the battery 202 provides power to at least one of the microcontroller 206 or the indicator 208. Additionally or alternatively, a second battery can be implemented to provide power to at least one of the microcontroller 206 or the indicator 208 independent of the battery 202.

Figure 3:
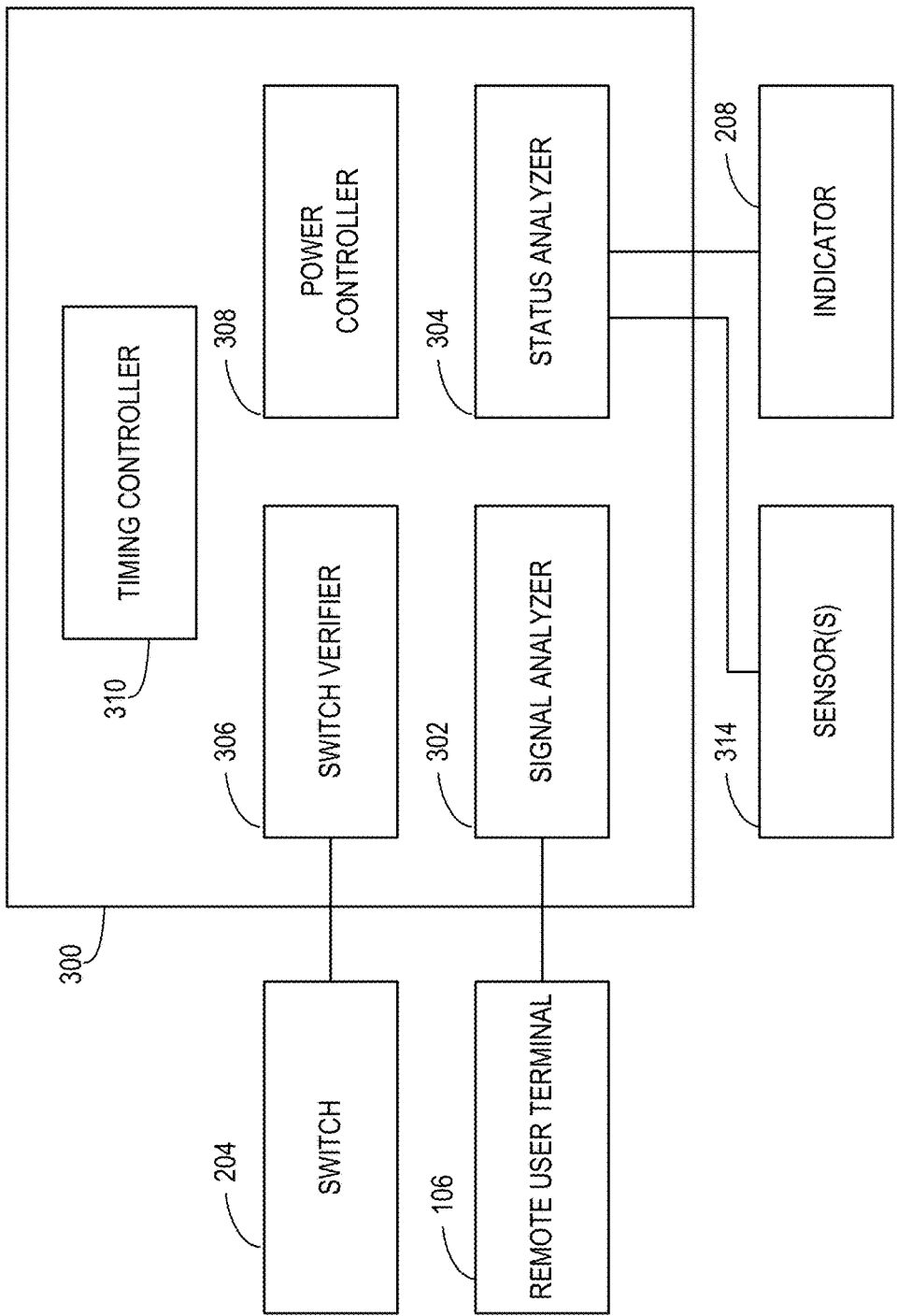
FIG. 3 is a schematic overview of an example power sequence analysis system that can be implemented in examples disclosed herein.

FIG. 3 is a schematic overview of an example power sequence analysis system 300 that can be implemented in examples disclosed herein. For example, the power sequence analysis system 300 can be implemented in the onboard controller 110 of FIG. 1 and/or the microcontroller 206 of FIG. 2. The example power sequence analysis system 300 includes a signal analyzer 302, a status analyzer 304, a switch verifier 306, a power controller 308, and a timing controller 310.

The example signal analyzer 302 of the illustrated example is communicatively coupled to the remote user terminal 106 and determines whether a power on signal has been received from the remote user terminal 106 in response to a power on command from the operator. In some examples, the signal analyzer 302 authenticates signals (e.g., via an encryption key, via a unique identifier associated with the remote user terminal 106, etc.) from the remote user terminal 106.

The switch verifier 306 of the illustrated example is electrically coupled to the switch 204 and determines whether the switch 204 has been toggled on. In the illustrated example, the switch verifier 306 determines that the switch 204 has been toggled on before the signal analyzer 302 is initiated to detect, receive and/or confirm the power on signal from the remote user terminal 106.

In response to the switch 204 being toggled on and the power on signal being received at the signal analyzer 302, the example power controller 308 provides an input signal to the logic gate 210 which, in turn, causes the logic gate 210 to electrically couple the battery 202 (shown in FIG. 2) to the propulsion system of the aircraft 102 in FIG. 1 via the FET 212 (also shown in FIG. 2).

The example timing controller 310 causes a delay (e.g., a waiting period) during a power up sequence of the aircraft 102. The delay can enable ground crew and/or operator(s) to clear away from the aircraft 102 of FIG. 1 prior to the propulsion system 216 of the aircraft 102 being powered on. For example, in response to the switch 204 being toggled on, the example timing controller 310 causes a first delay, in which the signal analyzer 302 ignores and/or delays processing of the signal from the remote user terminal 106 until the first delay has ended. Further, the example timing controller 310 can cause a second delay in response to the power on signal being received at the signal analyzer 302, such that the power controller 308 is prevented from electrically coupling the battery 202 to the propulsion system 216. The first delay and the second delay can have the same or different durations. In some examples, additional delays can be implemented.

The example status analyzer 304 determines the status of the power up sequence and, in turn, instructs the indicator 208 to display a visual indication corresponding to the status of the power up sequence. In response to the power controller 308 determining that the battery 202 has been connected to the FET 212, the status analyzer 304 instructs the indicator 208 to display a first visual indication. In one example, the first visual indication includes turning on a blue LED of the indicator 208. In response to the switch verifier 306 determining that the switch 204 has been toggled on, the status analyzer 304 instructs the indicator 208 to display a second visual indication. In one example, the second visual indication includes turning on a yellow LED of the indicator 208. Further, in response to the signal analyzer 302 receiving a power on signal from the remote user terminal 106, the example status analyzer 304 directs the indicator 208 to display a third visual indication. In one example, the third visual indication includes turning on the yellow LED of the indicator 208. In response to the power controller 308 electrically coupling the battery 202 to the propulsion system 216 of the aircraft 102, the example status analyzer 304 directs the indicator 208 to display a fourth visual indication. In one example, the fourth visual indication includes turning on a red LED of the indicator 208. In other examples, the first, second, third, and/or fourth visual indications can include turning on any of the one or more LEDs of one or more colors of the indicator 208.

In some examples, the status analyzer 304 is electrically coupled to one or more sensors 314 of the aircraft 102 and/or the remote user terminal 106. In some examples, the sensors 314 can be implemented to detect a presence of a person proximate the aircraft 102. Additionally or alternatively, the sensors 314 can detect an external condition of the aircraft 102 and/or an environmental condition (e.g., weather, temperature). In response to the sensors 314 detecting at least one of the presence of a person proximate the aircraft 102, an external condition of the aircraft 102, and/or an unfavorable environmental condition (e.g., rain, inclement weather, etc.), the sensors 314 can direct the status analyzer 304 to prevent electrical coupling of the battery 202 to the propulsion system 216.

In some examples, the power sequence analysis system 300 determines that the power up sequence was unsuccessful in response to one or more actions in the sequence being omitted and/or incorrectly sequenced. For example, transmitting the power up signal from the remote user terminal 106 prior to the switch 204 being toggled on can cause the power sequence analysis system 300 to determine that the power up sequence was unsuccessful. In response to the power up sequence being unsuccessful, the example status analyzer 304 instructs the indicator 208 to display a fifth visual indication. In one example, the fifth visual indication includes alternating between turning on the yellow LED and the blue LED of the indicator 208. In other examples, the fifth visual indication can include turning on any of the one or more LEDs of one or more colors of the indicator 208. Additionally or alternatively, in response to the power up sequence being unsuccessful, the power sequence analysis system 300 instructs the power up sequence to restart.

While an example manner of implementing the power sequence analysis system 300 of FIG. 3 is illustrated in FIG.

3, one or more of the elements, processes and/or devices illustrated in FIG. 3 may be combined, divided, re-arranged, omitted, eliminated and/or implemented in any other way. Further, the example signal analyzer 302, the example status analyzer 304, the example switch verifier 306, the example power controller 308, the example timing controller 310 and/or, more generally, the example power sequence analysis system 300 of FIG. 3 may be implemented by hardware, software, firmware and/or any combination of hardware, software and/or firmware. Thus, for example, any of the example signal analyzer 302, the example status analyzer 304, the example switch verifier 306, the example power controller 308, the example timing controller 310 and/or, more generally, the example power sequence analysis system 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal analyzer 302, the example status analyzer 304, the example switch verifier 306, the example power controller 308, the example timing controller 310 and/or, more generally, the example power sequence analysis system 300 is/are hereby expressly defined to include a non-transitory computer readable storage device or storage disk such as a memory, a digital versatile disk (DVD), a compact disk (CD), a Blu-ray disk, etc. including the software and/or firmware. Further still, the example power sequence analysis system 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
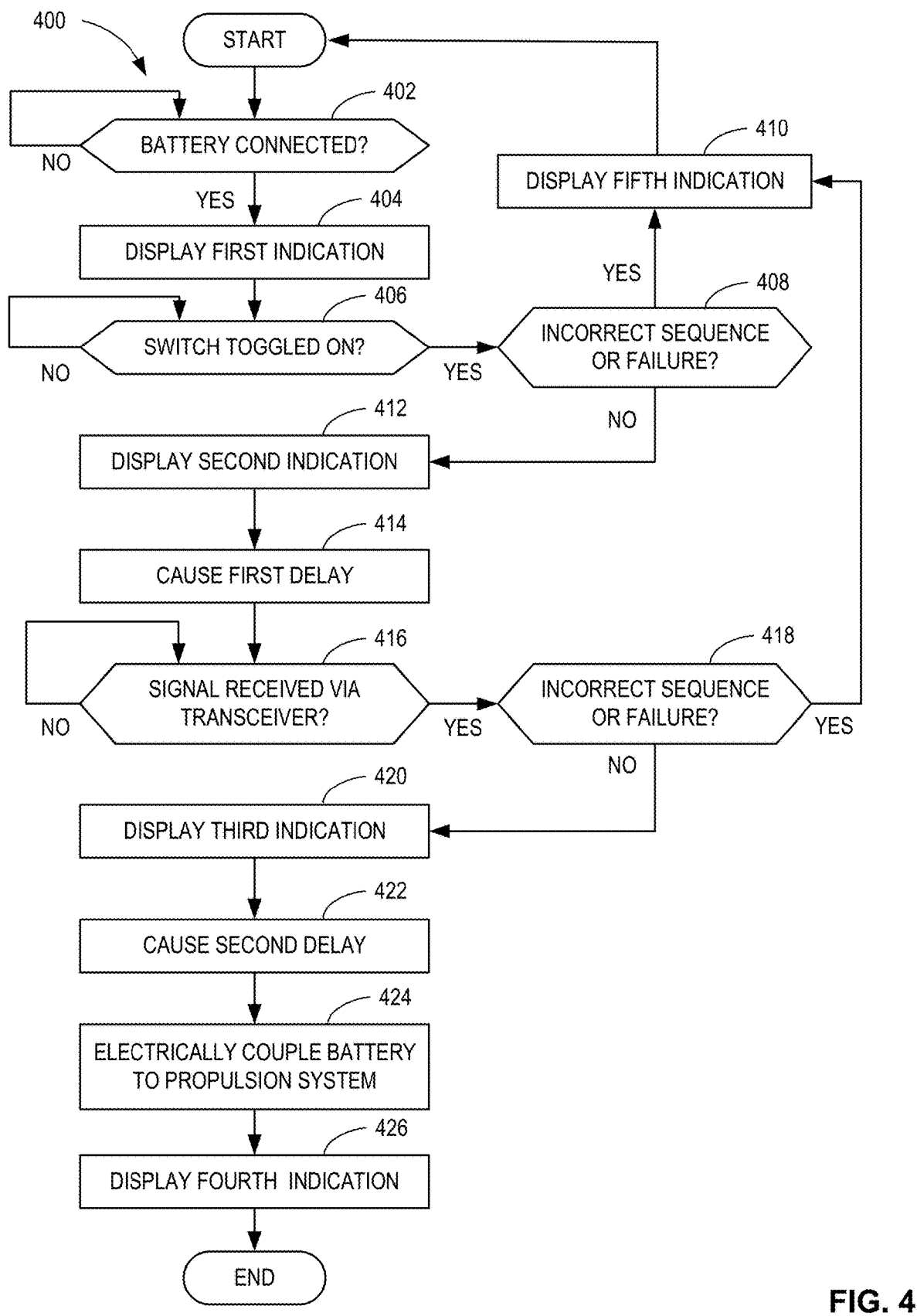
FIG. 4 is a flowchart representative of machine readable instructions which may be executed to implement the example power sequence control system of FIG. 2 and/or the example power sequence analysis system of FIG. 3.

A flowchart representative of example hardware logic, machine readable instructions, hardware implemented state machines, and/or any combination thereof for implementing the power sequence analysis system 300 of FIG. 3 is shown in FIG. 4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example power sequence analysis system 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 400 of FIG. 4 begins as the aircraft 102 is on the ground and no power is being supplied to the propulsion system 216. In the illustrated example, one or more ground crew operators are proximate the aircraft 102 to install the battery 202 to the aircraft 102 and/or actuate the switch 204, and one or more remote operators are at a distance from the aircraft 102 to operate the remote user terminal 106.

At block 402, the power controller 308 determines whether the battery 202 has been connected to the FET 212. In response to the power controller 308 determining that the battery 202 has been connected (block 402), the process proceeds to block 404. Otherwise, the process returns to and/or remains at block 402 until the battery 202 is connected.

At block 404, the status analyzer 304 directs the indicator 208 to display the first visual indication. In this example, the first visual indication indicates to the one or more operators that the battery 202 is connected.

At block 406, the switch verifier 306 determines whether the switch 204 has been toggled on. In response to the switch verifier 306 determining that the switch 204 has been toggled on (block 406), the process proceeds to block 408. Otherwise, the process returns to and/or remains at block 406 until the switch 204 is toggled on.

At block 408, the status analyzer 304 determines whether an incorrect sequence in the power up sequence and/or a failure in the power up sequence has occurred. In response to the status analyzer 304 determining that an incorrect sequence and/or a failure in the power up sequence has occurred (block 408), the process proceeds to block 410. Otherwise, the process proceeds to block 412.

At block 410, the status analyzer 304 directs the indicator 208 to display the fifth visual indication. In this example, the fifth visual indication indicates to the one or more operators that an incorrect sequence and/or a failure in the power up sequence has occurred. The process restarts.

At block 412, the status analyzer 304 directs the indicator 208 to display the second visual indication. In this example, the second visual indication indicates to the one or more operators that the switch 204 has been toggled on.

At block 414, the timing controller 310 causes the first delay to occur.

At block 416, the signal analyzer 302 determines whether a power on signal has been received from the remote user terminal 106 via the transceiver 218. In response to the signal analyzer 302 determining that the power on signal has been received (block 416), the process proceeds to block 418. Otherwise, the process returns to and/or remains at block 416 until a power on signal has been received.

At block 418, the status analyzer 304 determines whether an incorrect sequence in the power up sequence and/or a failure in the power up sequence has occurred. In response to the status analyzer 304 determining that an incorrect sequence and/or a failure in the power up sequence has occurred (block 418), the process proceeds to block 410. Otherwise, the process proceeds to block 420.

At block 420, the status analyzer 304 instructs the indicator 208 to display the third visual indication. In this example, the third visual indication indicates to the one or more operators that the power on signal has been received from the remote user terminal 106.

At block 422, the timing controller 310 causes the second delay to occur.

At block 424, the power controller 308 electrically couples the battery 202 to the propulsion system of the aircraft 102. In particular, the FET 212 enables electric current to flow from the battery 202 to the electronic speed controller 214. In turn, the electronic speed controller 214 controls a rotational speed of one or more rotors of the aircraft 102.

At block 426, the status analyzer 304 instructs the indicator 208 to display the fourth visual indication. In this example, the fourth visual indication indicates to the one or more operators that the power is being supplied to the propulsion system of the aircraft 102. The process then ends.

Figure 5:
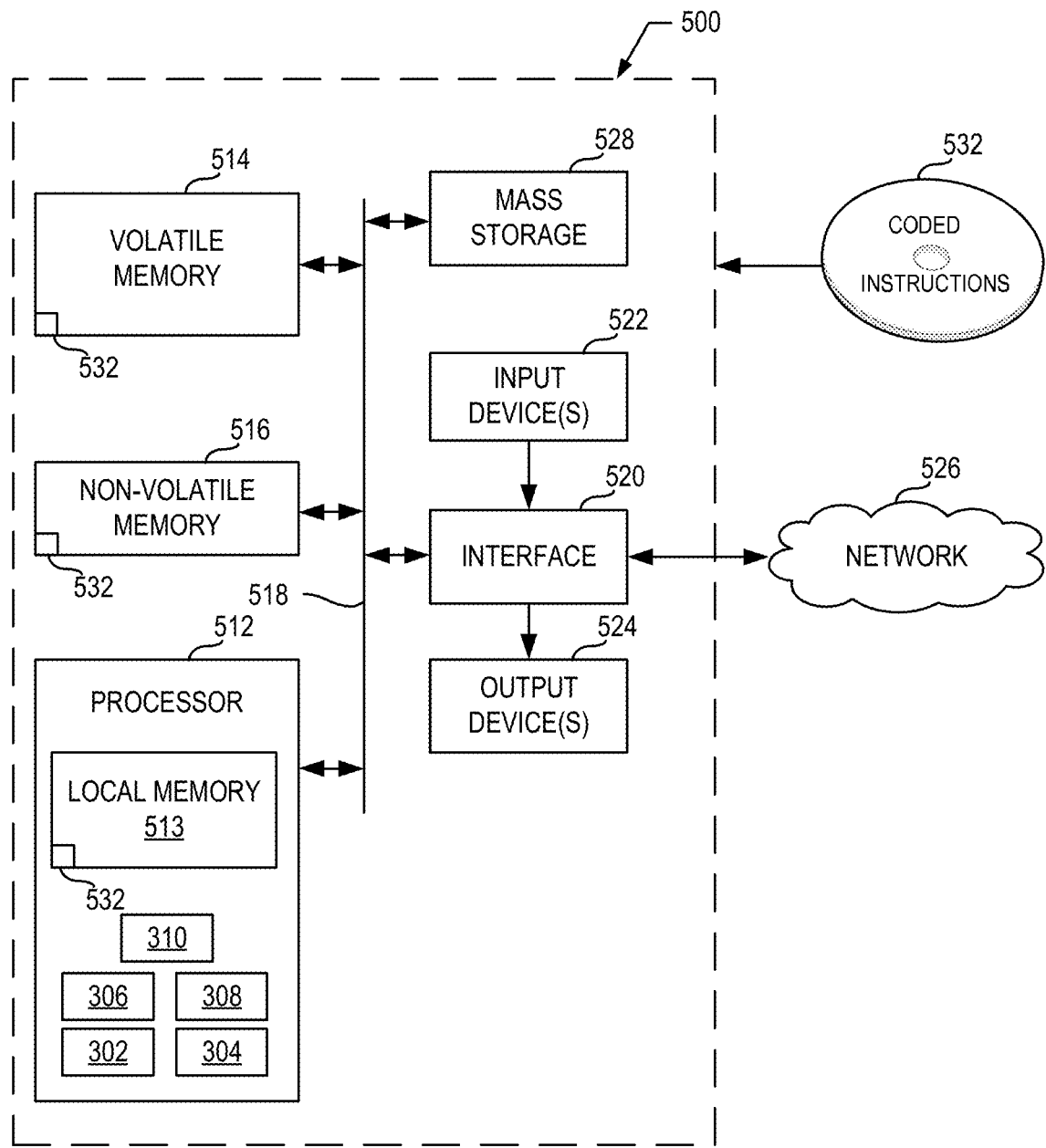
FIG. 5 is a block diagram of an example processing platform structured to execute the instructions of FIG. 4 to implement the example power sequence control system of FIG. 2 and/or the example power sequence analysis system of FIG. 3.

FIG. 5 is a block diagram of an example processor platform 500 structured to execute the instructions of FIG. 4 to implement the power sequence analysis system 300 of FIG. 3. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements the example signal analyzer 302, the example status analyzer 304, the example switch verifier 306, the example power controller 308, and the example timing controller 310.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIG. 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that enable a controlled execution of a power up sequence of a UAV and visually indicate a status of the power up sequence. As a result, a probability of inadvertent or accidental start up of the propulsion system is reduced.

The following pertain to further examples disclosed herein.

Example 1 includes a system for controlling a power up sequence of an unmanned aerial vehicle (UAV). The system includes a remote user terminal, and a power sequence control interface including a transceiver communicatively coupled to the remote user terminal, a user-operated switch of the UAV, and a power controller to electrically couple a power source of the UAV to a propulsion system of the UAV in response to the user-operated switch being toggled on and the power sequence control interface receiving, via the transceiver, a power on signal from the remote user terminal.

Example 2 includes the system of Example 1, and further includes a status indicator of the UAV, the status indicator to display one or more visual indications.

Example 3 includes the system of Example 2, where the status indicator is to display a first visual indication in response to the user-operated switch being toggled on, a second visual indication in response to the power sequence control interface receiving the power on signal from the remote user terminal, and a third visual indication in response to the power controller electrically coupling the power source of the UAV to the propulsion system of the UAV.

Example 4 includes the system of Example 3, where the status indicator is to display a fourth visual indication in response to an unsuccessful power up sequence.

Example 5 includes the system of Example 4, where the status indicator is to generate one or more audio indications.

Example 6 includes the system of any of Examples 3 or 4, and further includes a timing controller to cause a first delay in response to the user-operated switch being toggled on, and a second delay in response to the power sequence control interface receiving the power on signal from the remote user terminal.

Example 7 includes an apparatus for controlling a power up sequence of an unmanned aerial vehicle (UAV), which includes a switch verifier to determine whether a user-operated switch has been toggled on, a signal analyzer to determine whether a power on signal has been received from a remote user terminal, and a power controller to electrically couple a propulsion system of the UAV to a power source of the UAV in response to the user-operated switch being toggled on and the power on signal being received from the remote user terminal.

Example 8 includes the apparatus of Example 7, and further includes a status analyzer to determine a condition associated with the UAV, the status analyzer to prevent electrical coupling of the propulsion system based on the condition.

Example 9 includes the apparatus of Example 8, where the condition includes a detected presence of a person proximate the UAV.

Example 10 includes the apparatus of Example 8, where the condition includes at least one of an external condition of the UAV or weather.

Example 11 includes the apparatus of any of Examples 7 to 10, and further includes a timing controller to cause a first delay in response to the user-operated switch being toggled on, and a second delay in response to the power on signal being received from the remote user terminal.

Example 12 includes a method. The method includes determining, by executing instructions with at least one processor, that a user-operated switch of an unmanned aerial vehicle (UAV) has been toggled on, determining, by executing instructions with the at least one processor, that a power on signal has been received from a remote user terminal, and, in response to the user-operated switch being toggled on and receiving the power on signal from the remote user terminal, electrically coupling, by executing instructions with the at least one processor, a power source of the UAV to a propulsion system of the UAV.

Example 13 includes the method of Example 12, and further includes displaying a first visual indication in response to determining that the user-operated switch has been toggled on, a second visual indication in response to determining that the power on signal has been received from the remote user terminal, and a third visual indication in response to electrically coupling the power source of the UAV to the propulsion system of the UAV.

Example 14 includes the method of Example 13, and further includes displaying a fourth visual indication in response to an unsuccessful power up sequence.

Example 15 includes the method of Example 14, and further includes generating one or more audio indications.

Example 16 includes the method any of Examples 13 to 15, and further includes causing a first delay in response to the user-operated switch being toggled on, and a second delay in response to receiving the power on signal from the remote user terminal.

Example 17 includes a non-transitory computer readable storage medium includes instructions that, when executed, cause a processor to at least determine that a user-operated switch of an unmanned aerial vehicle (UAV) has been toggled on, determine that a power on signal has been received from a remote user terminal, and in response to the user-operated switch being toggled on and receiving the power on signal from the remote user terminal, enable electrically coupling of a power source of the UAV to a propulsion system of the UAV.

Example 18 includes the non-transitory computer readable storage medium of Example 17, where the instructions, when executed, cause the processor to display a first visual indication in response to determining that the user-operated switch has been toggled on, a second visual indication in response to determining that the power on signal has been received from the remote user terminal, and a third visual indication in response electrically coupling the power source of the UAV to the propulsion system of the UAV.

Example 19 includes the non-transitory computer readable storage medium of Example 18, where the instructions, when executed, cause the processor to display a fourth visual indication in response to an unsuccessful power up sequence.

Example 20 includes the non-transitory computer readable storage medium any of Examples 18 or 19, where the instructions, when executed, cause the processor to cause a first delay in response to the user-operated switch being toggled on, and a second delay in response to receiving the power on signal from the remote user terminal.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system for controlling a power up sequence of an unmanned aerial vehicle (UAV), the system comprising:
   a remote user terminal; and
   a power sequence control interface including:
      a transceiver communicatively coupled to the remote user terminal;
      a user-operated switch of the UAV; and
      a power controller to verify that a power up sequence has occurred, the power up sequence including the user-operated switch being toggled on prior to the power sequence control interface receiving, via the transceiver, a power on signal from the remote user terminal, the power controller to electrically couple a power source of the UAV to a propulsion system of the UAV in response to verifying the power up sequence has occurred.

2. The system as defined in claim 1, further including a status indicator of the UAV, the status indicator to display first and second visual indications, the first visual indication corresponding to the user-operated switch being toggled on, the second visual indication corresponding to the power on signal being received from the remote user terminal.

3. The system as defined in claim 2, wherein the status indicator is to display a third visual indication in response to the power controller electrically coupling the power source of the UAV to the propulsion system of the UAV.

4. The system as defined in claim 3, wherein the status indicator is to display a fourth visual indication in response to an unsuccessful power up sequence.

5. The system as defined in claim 4, wherein the status indicator is to generate one or more audio indications.

6. The system as defined in claim 3, further including a timing controller to cause a first delay in response to the user-operated switch being toggled on, and a second delay in response to the power sequence control interface receiving the power on signal from the remote user terminal.

7. An apparatus for controlling a power up sequence of an unmanned aerial vehicle (UAV), the apparatus comprising:
   a switch verifier to determine whether a user-operated switch has been toggled on;
   a signal analyzer to determine whether a power on signal has been received from a remote user terminal; and
   a power controller to electrically couple a propulsion system of the UAV to a power source of the UAV in response to a power up sequence occurring, the power up sequence corresponding to the user-operated switch being toggled on prior to the power on signal being received from the remote user terminal.

8. The apparatus as defined in claim 7, further including a status analyzer to determine a condition associated with the UAV, the status analyzer to prevent electrical coupling of the propulsion system based on the condition.

9. The apparatus as defined in claim 8, wherein the condition includes a detected presence of a person proximate the UAV.

10. The apparatus as defined in claim 8, wherein the condition includes at least one of an external condition of the UAV or weather.

11. The apparatus as defined in claim 7, further including a timing controller to cause a first delay in response to the user-operated switch being toggled on, and a second delay in response to the power on signal being received from the remote user terminal.

12. A method comprising:
 determining, by executing instructions with at least one processor, that a user-operated switch of an unmanned aerial vehicle (UAV) has been toggled on;
 determining, by executing instructions with the at least one processor, that a power on signal has been received from a remote user terminal;
 verifying, by executing instructions with the at least one processor, a power up sequence has occurred, the power up sequence corresponding to receiving the power on signal subsequent to the user-operated switch being toggled on; and
 in response to the power up sequence being verified, electrically coupling, by executing instructions with the at least one processor, a power source of the UAV to a propulsion system of the UAV.

13. The method as defined in claim 12, further including displaying:
 a first visual indication in response to determining that the user-operated switch has been toggled on;
 a second visual indication in response to determining that the power on signal has been received from the remote user terminal; and
 a third visual indication in response to electrically coupling the power source of the UAV to the propulsion system of the UAV.

14. The method as defined in claim 13, further including displaying a fourth visual indication in response to an unsuccessful power up sequence.

15. The method as defined in claim 14, further including generating one or more audio indications.

16. The method as defined in claim 13, further including causing a first delay in response to the user-operated switch being toggled on, and a second delay in response to receiving the power on signal from the remote user terminal.

17. A non-transitory computer readable storage medium comprising instructions that, when executed, cause a processor to at least:
 determine that a user-operated switch of an unmanned aerial vehicle (UAV) has been toggled on;
 determine that a power on signal has been received from a remote user terminal;
 verify that a power up sequence has occurred, the power up sequence corresponding to receiving the power on signal subsequent to the user-operated switch being toggled on; and
 in response to the power up sequence being verified, enable electrically coupling of a power source of the UAV to a propulsion system of the UAV.

18. The non-transitory computer readable storage medium as defined in claim 17, wherein the instructions, when executed, cause the processor to display:
 a first visual indication in response to determining that the user-operated switch has been toggled on;
 a second visual indication in response to determining that the power on signal has been received from the remote user terminal; and
 a third visual indication in response to electrically coupling the power source of the UAV to the propulsion system of the UAV.

19. The non-transitory computer readable storage medium as defined in claim 18, wherein the instructions, when executed, cause the processor to display a fourth visual indication in response to an unsuccessful power up sequence.

20. The non-transitory computer readable storage medium as defined in claim 18, wherein the instructions, when executed, cause the processor to cause a first delay in response to the user-operated switch being toggled on, and a second delay in response to receiving the power on signal from the remote user terminal.

21. The system as defined in claim 1, further including a logic gate to electrically couple the power source of the UAV to the propulsion system of the UAV.

22. The system as defined in claim 21, wherein the power controller is to provide first and second signals to the logic gate, the first signal corresponding to the user-operated switch being toggled on, the second signal corresponding to receiving the power on signal from the remote user terminal, the logic gate to cause electrical current to flow from the power source of the UAV to the propulsion system of the UAV in response to the logic gate receiving the first and second signals.

* * * * *